United States Patent [19]

Aiello et al.

[11] Patent Number: 4,819,246
[45] Date of Patent: Apr. 4, 1989

[54] SINGLE FREQUENCY ADAPTER

[75] Inventors: Marc F. Aiello, Oakmont; John J. Grazulis, Pittsburgh, both of Pa.

[73] Assignee: Aerotech, Inc., Pittsburgh, Pa.

[21] Appl. No.: 172,262

[22] Filed: Mar. 23, 1988

[51] Int. Cl.⁴ .............................................. H01S 3/03
[52] U.S. Cl. ....................................... 372/107; 372/26; 372/68; 372/82
[58] Field of Search ............... 372/107, 108, 106, 103, 372/98, 26, 27, 28, 29, 32, 65, 34, 18, 19, 82, 31

[56] References Cited

U.S. PATENT DOCUMENTS

| | | | |
|---|---|---|---|
| 3,586,997 | 6/1971 | Kinsel | 331/94.5 |
| 3,594,660 | 7/1971 | Huggett | 331/94.5 |
| 3,646,468 | 2/1972 | Buczek et al. | 331/94.5 |
| 3,646,469 | 2/1972 | Buczek et al. | 331/94.5 |
| 3,651,424 | 3/1972 | Ueno et al. | 331/94.5 |
| 3,713,042 | 1/1973 | Kinsel | 331/94.5 |
| 3,725,814 | 4/1973 | Schlossberg | 331/94.5 |
| 3,733,129 | 5/1973 | Bridges | 356/5 |
| 3,851,275 | 11/1974 | Furuse et al. | 372/107 |
| 4,025,875 | 5/1977 | Fletcher et al. | 331/94.5 S |
| 4,064,466 | 12/1977 | Seki et al. | 372/107 |
| 4,181,898 | 1/1980 | McAllister | 331/94.5 |
| 4,216,438 | 8/1980 | Seki et al. | 372/107 |
| 4,387,462 | 6/1983 | Markus | 372/32 |
| 4,393,503 | 7/1983 | Angelbeck et al. | 372/20 |
| 4,590,598 | 5/1986 | O'Harra, II | 372/38 |
| 4,672,618 | 9/1987 | Wijntjes et al. | 372/32 |

FOREIGN PATENT DOCUMENTS 3411840  10/1985  Fed. Rep. of Germany ...... 372/108

OTHER PUBLICATIONS

"Frequency Stabilization of Gas Lasers", A. D. White, IEEE Journal of Quantum Electronics, vol. QE-1, No. 8, Nov., 1965, pp. 349-357.

Primary Examiner—William L. Sikes
Assistant Examiner—Xuan Thi Vo
Attorney, Agent, or Firm—Webb, Burden, Ziesenheim & Webb

[57] ABSTRACT

A single frequency adapter for a gas laser comprises a jacket for engaging and being secured to the casing surrounding the gas laser. An induction coil is fixed within the jacket and positioned to surround the hollow mirror mount at one end of the laser tube while being outwardly spaced from the hollow mount. A power supply and modulator apply an alternating current to the induction coil.

5 Claims, 4 Drawing Sheets

SINGLE FREQUENCY ADAPTER

FIELD OF THE INVENTION

This invention relates to power stabilized, single frequency laser systems.

BACKGROUND OF THE INVENTION

Most simply stated, a laser comprises an energizeable lasing medium confined in an optical resonator cavity. Typically, the laser comprises a tube for containing the lasing medium with mirrors at each longitudinal end defining the resonator cavity. The frequency of the output is determined by the properties of the lasing medium and the configuration of the resonator.

Considering the lasing medium, the central frequency of the output is determined by the available laser transitions of the medium. The transition promoted in most helium-neon lasers results in an output having a wavelength of 6328 angstroms. Due to the thermal motion along the lasing axis of the atoms that comprise the lasing medium, output frequencies shifted up or down from the central frequency are possible. The intensity distribution of the shifted output frequencies is defined by a curve usually referred to as the Doppler profile. It is often predicted by the following equation:

$$I = I_o(\exp(-Mc^2\Delta v^2/2v_o^2 KT) - 1)\eta^2$$

where
- $v_o$ is the unshifted or central frequency,
- $I_o$ is the intensity at the central frequency,
- $\eta$ is the ratio of available centerline gain to total losses (i.e. $g_o$/total losses),
- M is atomic mass,
- c is the speed of light,
- KT is an electron temperature relationship, and
- $\Delta v$ is the difference frequency of a given mode from the centerline.

Figures 1A, 1B, 1C:
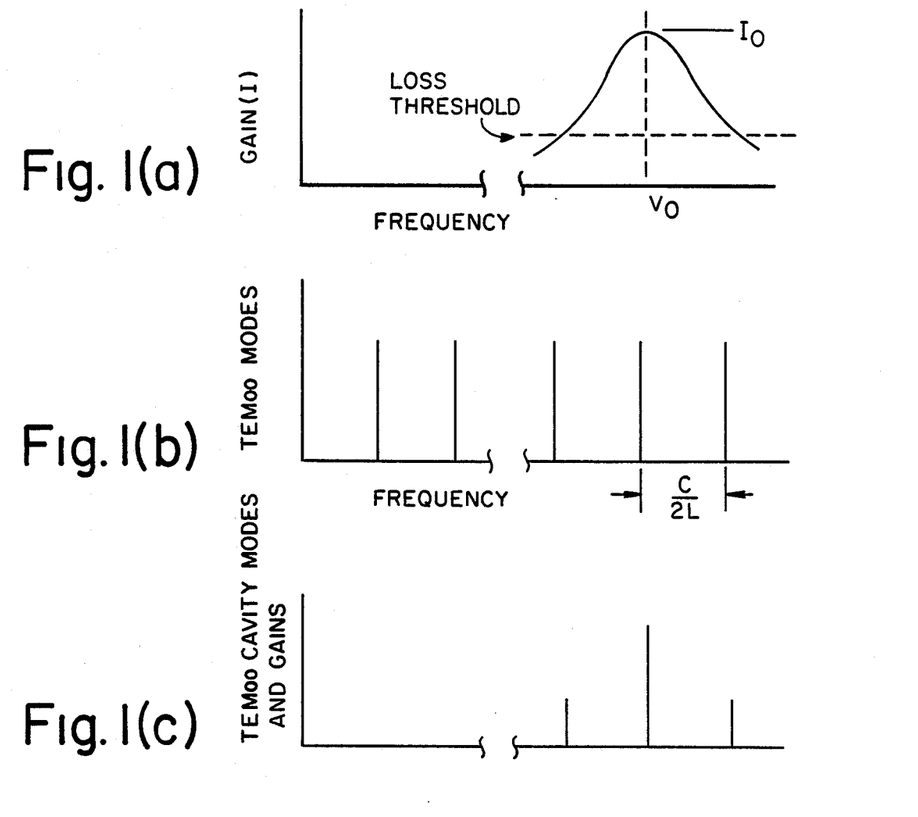
FIGS. 1(a), 1(b), and 1(c) illustrate the spectrum of a hypothetical gas laser for explaining both the prior art and this invention.

FIG. 1(a) illustrates a typical Doppler profile, that is, the frequency spectrum versus gain relation for a hypothetical lasing medium with a central lasing frequency of $v_o$ and an intensity at that frequency of $I_o$. The gain at frequencies on both sides of the central frequency drop off until falling below the loss threshold. The immediate significance of the Doppler profile (or the effect it quantifies known as Doppler broadening) is that a laser can potentially output light over a range of frequencies near the central frequency. However, as the gain of a Doppler shifted frequency falls below a loss threshold, resonances cannot be sustained.

Considering now the optical resonator cavity, the end mirrors of the cavity define the length of the cavity along the optical axis. For any cavity there exists normal modes or field configurations that will sustain oscillations within the resonator. The modes of a laser resonator are typically defined by the symbol TEMmnq where m, n, and q define the number of modes, n, m in the transverse directions and q the number of modes in the longitudinal direction. For helium-neon lasers the numbers m, n are usually very small and often zero. The number q defines the number of longitudinal modes (the number of half wavelengths between the two mirrors) and is usually a very large number. The number q also defines the number of longitudinal modes for a given cavity. For any given cavity length, L in centimeters, the frequency spacing of the available modes will be C/2L in Megahertz. Hence, the shorter the length L, the further apart the frequencies that will resonate within a given optical cavity. FIG. 1(b) illustrates the frequency spectrum of an optical resonator cavity of length L for the TEM00q modes.

The interaction between the available cavity modes and the frequencies which the lasing medium will support under its Doppler profile are illustrated by FIG. 1(c) which is the intersection of FIGS. 1(a) and 1(b). For the hypothetical laser described there exists three modes under the Doppler profile and three frequencies that will be emitted by the laser. If the spacing C/2L is large enough, only a single frequency will be emitted.

In a helium-neon laser, as with the hypothetical laser already described, only those resonances which have sufficient gain will oscillate. This gain is available from the population inversion between the valence states $3s_2$ and $2p_4$ for the 6328 angstrom line in neon. In most helium-neon lasers, natural neon is used which is comprised of a mixture of the isotopes of $Ne_{22}$ and $Ne_{20}$ with about 80% being the latter.

In order to obtain a more uniform gain profile, a single isotope fill is utilized in most cases using $Ne_{20}$. Also, by choosing a single isotope of neon, a well defined centerline frequency can be used as a frame of reference.

Power output of the laser will vary by changes in the mode location under the Doppler gain profile. This change is often referred to as "mode-sweeping". Since mode location is influenced by the mode spacing C/2L, changes in cavity length will cause frequency shifting through the gain profile and thus cyclic changes in output power. By controlling the cavity spacing, one is able to control the desired output power or output frequency.

Mode sweeping can be described quite easily. Note that small changes to the cavity length resulting, say, due to temperature changes, will result in a small change to the mode spacing as described. While these changes are barely noticeable in the low frequency portion of the spectrum, their effect is cumulative in nature and will be quite noticeable in the frequency region of $v_o$ (the region of laser output).

As temperature increases, the cavity will expand causing the mode spacing C/2L to decrease. This will have the effect on the modes in the vicinity of $v_o$ to shift towards the low frequency domain. The opposite is true for temperature decreases. It is this phenomena which allows for the control of linear output single frequency lasers.

The approaches used to expand and contract the cavity may vary. Heating the cavity is widely used since it is easy to generate and control. However, response can be quite slow especially for designs with large thermal inertias. Piezoelectric crystals have also been employed which are generally much more responsive bu suffer due to the fact that they are more difficult and expensive to apply.

The output powers associated with the cavity modes that oscillate under the Doppler profile each have a distinct frequency. Obviously for very short lasers the mode spacing will be larger and only one mode would be able to fit under the gain profile at one time. This would correspond to a cavity length of less than 4.5 inches. For very long lasers, many cavity modes may oscillate at one time. For instance, a known 16 mW helium-neon laser (over 30 inches long) can oscillate with up to 13 modes if the cavity losses are sufficiently small.

The laser length that is popular in most stabilized frequency applications is about 7 to 9 inches. At this length no more than 2 modes can oscillate at one time (which is important) and over 1mW can be generated by a single mode.

Each mode under the profile is not only distinct from adjacent modes by its frequency but also by its polarization. For instance, in a laser oscillating in two modes, the polarization of each mode will be orthogonal to the adjacent mode (angularly spaced by 90°). Such modes are often referred to as being "s" and "p" polarized With the addition of each mode the polarization will alternate as "s", "p", "s", etc. This fact is why no more than three modes can be tolerated for a single frequency laser application. A polarizer, for example, would pass two modes and coherence would be lost.

The term "randomly polarized" to describe lasers without Brewster windows is somewhat misleading. In fact, there is nothing "random" about such a tube. As described earlier, each mode as it enters the profile during mode sweeping takes on a polarization orthogonal to the adjacent mode. However, the orientation of the "s" or "p" cavity modes with respect to the laser tube does not move appreciably during the life of the tube. They become locked to a position on the tube caused by conditions during manufacturing. The phenomena that causes this polarization sensitivity is known as birefringence.

It is known that a certain level of birefringence is required for a "random" laser tube to be used in a single frequency application. Without it, the polarizations would migrate "randomly". However, too much stress birefringence can cause a phenomena known as "mode hopping". In this case, polarization sensitivity is more strongly oriented to either the "s" or "p" polarization plane so that as the intensity of the "unfavored" mode grows (and the intensity of the "favored" mode decreases), it hops to the favored polarization. This phenomena is unwanted in single frequency applications.

Most single frequency lasers, no matter the $servo$ technique, use a signal indicative of power associated with the individual modes as the feedback signal. The exceptions are iodine stabilized lasers and Zeemen Split Lasers, in which the latter required the use of a quarter wave plate to produce linear output. Therefore, most single frequency lasers are power stabilized lasers. Most manufacturers specify the level of frequency stability in terms of MHz or parts per billion.

As stated, power stabilization can be effected by adjusting the length of the laser cavity, that is, the length between the mirrors at each end. Thermal expansion has been used to adjust the length of prior helium-neon lasers. It is a desired method since standard tube designs can be employed. In these systems all or a portion of the laser cavity is heated by radiation or convection. However, use of thermal expansion and radiation or convection heating has a drawback; namely, a relatively long time constants within the control loop. A less used prior system is based upon piezoelectric control of the cavity length. In that system, a voltage sensitive crystal is used to vary the cavity length and thus provide much more rapid response but requires especially constructed laser tubes.

SUMMARY OF THE INVENTION

The system according to this invention provides the best features of both the prior thermal expansion techniques and the piezoelectric techniques for adjusting the cavity length to maintain constant output power. RF induction heating of a mirror mount provides rapid response compared to prior thermal expansion techniques yet can make use of existing or slightly modified existing tube designs. Standard helium-neon laser production techniques can be used. The system according to this invention enables an "adapter" approach to convert a standard "randomly polarized" laser system into a single frequency system.

Briefly, according to this invention, there is provided a system for rapidly changing the length between the mirrors of a laser cavity. A gas laser comprises a tube for containing a lasing medium. The lasing medium may be excited in a number of ways, for example, by a dc discharge. Mirrors mounted at each longitudinal end are supported by mounts extending from the end walls of the tube. At least one of the mirror mounts is hollow and made of a moninally electrically conducting material.

The hollow mirror mount is positioned so that the lasing axis passes through the interior thereof to reach the mirror mounted thereon. An induction coil surrounds the mirror mount and is outwardly spaced from said mount. A source of alternating current is connectable to the induction coil. A modulator is provided to modulate the ac current applied to the induction coil. When the ac current is applied to the coil it induces eddy currents in the hollow mirror mount causing it to be heated and expand. During operation the mirror mount is heated above the ambient temperature so that it will cool by radiation and convection.

The modulator enables the rate of energy inductively coupled to the mirror mount to be balanced against the rate of cooling. Hence, its length may be adjusted thereby adjusting the length of the entire laser cavity.

Further, according to this invention, there is provided a constant power single frequency laser. The mirrors and cavity are selected so that the polarization of cavity modes is fixed relative to the tube and so that no more than three adjacent cavity modes fall within the Doppler power profile above the loss threshold of the tube. At least one beam splitter and photo diode are arranged to sample the power of the output corresponding to at least one of the longitudinal cavity modes of the laser. A circuit generates a reference signal to command a power output level for the at least one cavity mode. The sampled power output is fed back and combined with the reference signal to provide an error signal that is used for controlling the modulator to maintain the output power of the laser substantially constant and thereby maintaining the output frequency of the laser substantially constant.

In a specific embodiment of this invention, an adapter for being removably attached to a casing surrounding a gas laser is provided to convert the "randomly polarized" laser into a constant power single frequency laser. The adapter is designed for use with a typical laser comprising a laser tube fixed within a casing. The mirror at the output end of the tube is secured to the tube by a hollow mirror mount made of a nominally electrically conducting material. The adapter comprises a jacket for engaging and being secured to the casing surrounding the gas laser at the output end thereof. An induction coil is fixed within said jacket and positioned to surround the hollow mirror mount while being outwardly spaced therefrom when the adapter engages the casing.

An electrical circuit applies an alternating current to the induction coil and modulates the current according to an input signal to the modulator. Mounted within the jacket along the lasing axis is at least one beam splitter and associated photo diode for sampling the power of the laser output corresponding to at least one of the longitudinal cavity modes of said laser. In a preferred embodiment, two beam splitters and two photo diodes are used to sample the power of the laser output for two adjacent differently polarized longitudinal cavity modes. The electrical circuit further provides feedback means originating at the photo diode or photo diodes for controlling the modulator to maintain the output power of the laser substantially constant.

DESCRIPTION OF THE DRAWINGS

Further features and other objects and advantages will become clear from the following detailed description made with reference to the drawings in which.

DESCRIPTION OF THE PREFERRED EMBODIMENTS

Figure 2:
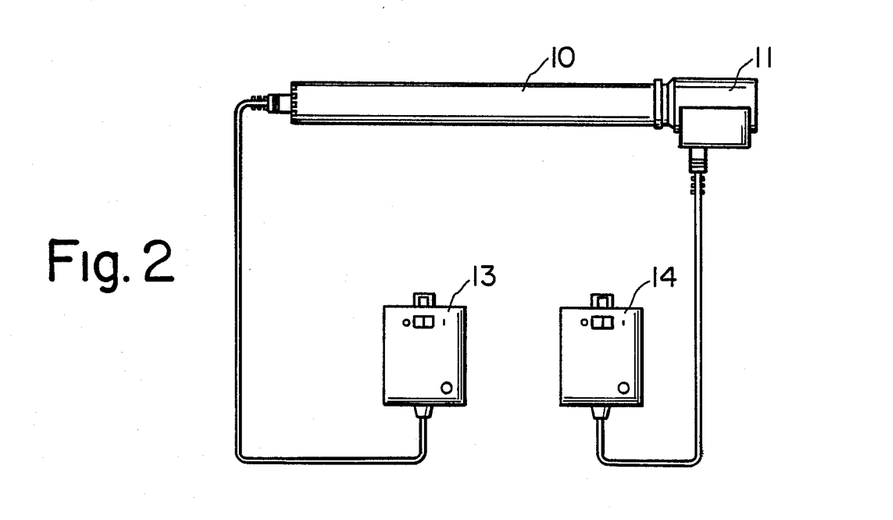
FIG. 2 is a view of a single frequency laser system according to this invention.

Referring to FIG. 2, there is shown a laser casing 10, with an attached adapter jacket 11, laser power supply 13 and adapter power supply 14.

Figure 3:
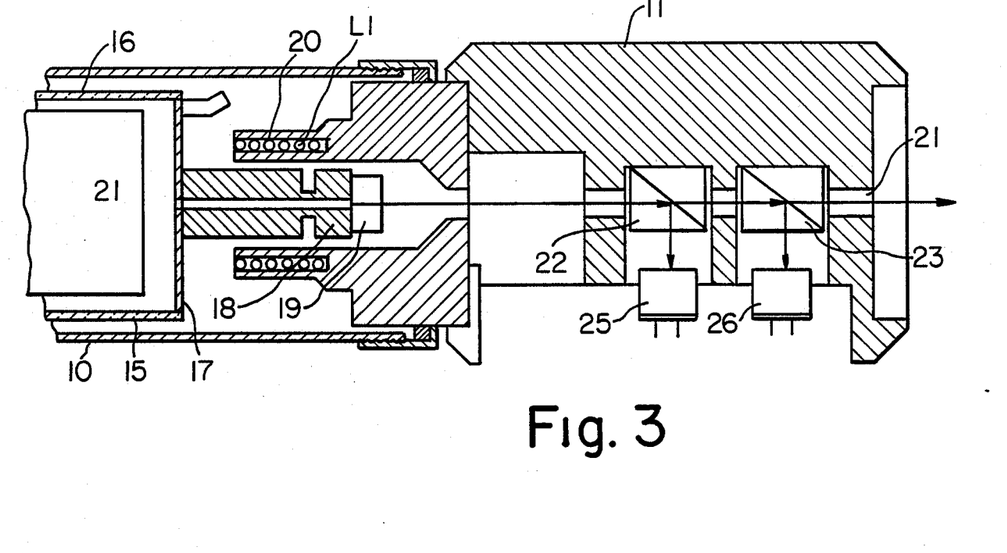
FIG. 3 is a section through a gas laser and adapter according to this invention.

Referring now to FIG. 3, the output end of a gas laser tube 15 is shown mounted within the casing 10. The tube comprises a glass cylinder 16 and a metal end plate 17. Extending from the end plate is a mirror mount 18 with a mirror 19 sealed thereto. This laser may be used without the adapter in which case an apertured cap would be mounted where the adapter jacket is mounted.

The adapter supports an induction coil 20 surrounding the mirror mount and spaced radially outwardly therefrom. The adapter has a passage 21 extending along the optical axis of the laser so that the laser output can pass therethrough. The adapter is shaped to receive a cube beam splitter 22 and a cube beam splitter 23 along the optical axis. Light sensitive diodes 25 and 26 are associated with the polarizer and splitter.

The beam first encounters cube beam splitter 22 which is aligned to block the "s" polarization while allowing the "p" polarization to pass (>98% "p" transmitting). The "s" polarization is internally reflected at 90° to the axis and may be used as the "s" component for feedback if so desired.

After passing through the polarizer, the beam which is largely "p" polarized encounters a cube beam splitter 23. This particular splitter is dielectrically coated so as to be strongly transmissive to the "p" component. It allows a majority of the "p" polarization to pass with relatively low absorption loss (<5%), while highly attenuating any small amount of "s" not blocked by the first polarizer. In any event, about 10% of the "p" component is reflected 90° to the axis and thus can be used as the "p" component feedback. This sampling system is unique in it allows for two adjacent modes to be sampled.

This sampling technique offers unparalleled polarization extinction performance (ratio of wanted "p" to unwanted "s"). The polarization extinction is maximum when the "p" component is aligned close to the centerline (minimum "s" component). A prototype laser adapter extinction ratio was measured at two regulated output powers. These measurements are as follows:

| $P_o$("p") | Extinction Ratio |
|---|---|
| 1.00 mW | >4000:1 |
| .30 mW | >1000:1 |

Figure 4:
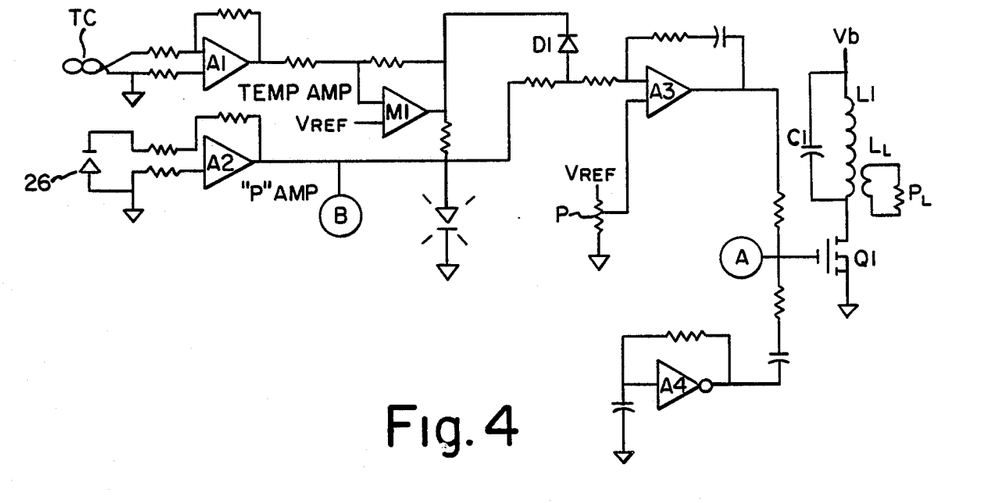
FIG. 4 is a schematic circuit diagram for the electronics of the system according to this invention.

The electronics for control of the adapter are illustrated in FIG. 4. The coil L1 (same as 20 in FIG. 3) has a tuning capacitor C1 in parallel therewith. Transistor Q1 controls the current flow through the coil.

A certain level of power is required in order to maintain the desired raised temperature of the mirror mount. To achieve proper power transfer of the alternating current from the induction coil L1 (20 in FIG. 3) into the mirror mount (18 in FIG. 3), an impedance match must occur between Q1 and $R_L$, where $R_L$ and $L_L$ comprise an equivalent circuit of the mirror. According to general knowledge, the proper load, R, for Q1 is expressed by $R = Vb^2/2P$ where Vb is the applied dc voltage, and P is the amount of power to be transferred into the mirror mount. Since $R_L$ is low compared to R, an impedance step-down is used to achieve the required impedance match, and this is done by the turns ratio of L1 to $L_L$ where $L_L$ has one equivalent turn being the mirror mount proper (18). C1 is required to achieve resonance with L1 since Q1 is operating class C.

An oscillator comprised of inverting amplifier A4 drives the transistor Q1 at a frequency in the vicinity of 1 MHz. The leads from a thermocouple TC are applied to OP AMP A1. This signal is compared to a temperature reference signal in comparator M1. Until the temperature reference signal exceeds the feedback, it controls the error amplifier comprising OP AMP A3 so that the amplitude of the signal applied to the gate of transistor Q1 is not attenuated. As soon as the desired temperature is reached, the output the comparator M1 goes positive and current ceases to flow in the circuit of diode D1. At this time the laser power control begins. The output from the PIN diode 26 is applied to OP AMP A2. The amplified feedback signal is applied to the error amplifier A3 where it is compared with a reference signal taken at potentiometer P.

When the laser is first turned on, the circuit asks for maximum induction heating of the mirror mount to raise the mirror mount above room temperature. M1 sets the mirror mount operating temperature which must be obtained before the control loop is closed allowing for power/frequency stabilized operation. Once this temperature is obtained, D1 is unclamped allowing negative feedback from A2 to the error amplifier A3. The operating temperature of the mount (typically 80° C.) is obtained rather quickly at full modulation, say, in less than 30 seconds. However, due to the thermal inertia of the entire system "mode sync" is usually obtained and lost 3 times during the warmup period of the system (typically 30 minutes).

Amplitude modulation is achieved by mixing the signal from an oscillator (about 1 MHz) with the error signal from the error amp A3. The modulation is achieved directly at the gate of transistor Q1 which may be a power MOSFET transistor. The response between this modulated signal and the actual perturbation of the "p" polarization power was measured by injecting a signal into point (A) and measuring the resultant signal at test point (B) at the feedback amplifier A2. First order roll-off does not begin until almost 1.5 Hz which is an unparalleled response for a thermal system.

Before discussing various stabilization techniques, it is worth noting the effects of various parameter changes most often associated with tube life as they might effect the output stability performance of a stabilized laser.

Figure 5:
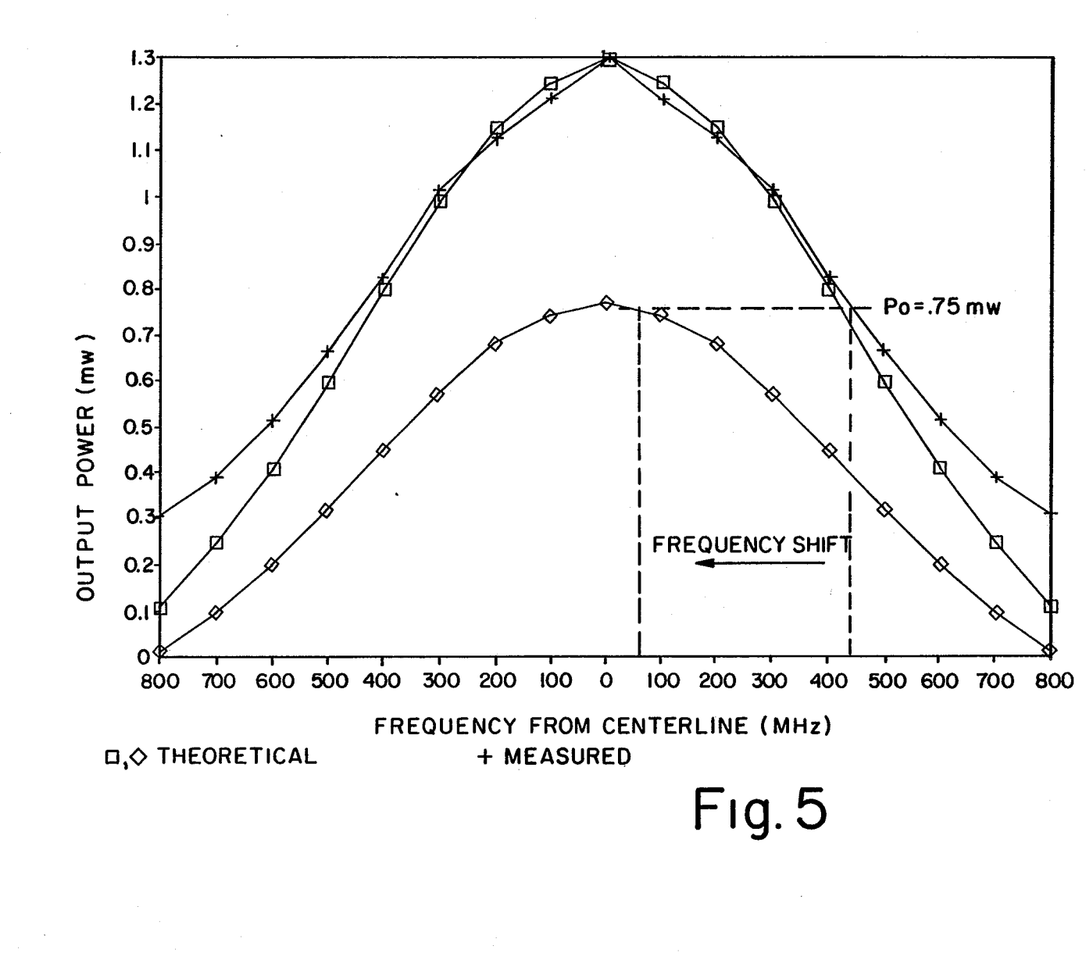
FIG. 5 is a group of Doppler profiles for a gas laser illustrating the potential change in profile over a period of time and its effect upon the frequency of a power stabilized laser according to this invention.

FIG. 5 depicts various Doppler power profiles for a helium-neon laser. The lower theoretical curve depicts the case where the $\eta$ drops to 80% of the initial value. This might occur due to neon clean-up during the lifetime of the tube (small signal gain G decreases by 20%) or by progressive mirror absorption loss increases.

Now if feedback is accomplished via a single mode, say the "p" polarization only, then it is obvious that a frequency shift will occur if the power were to reduce in the manner just described. For example, lets say the power of a single mode was originally set to 0.75 mW at the factory while the Doppler profile was in the original theoretical condition as shown in FIG. 5. Now lets say at the end of a 20,000 hour period, the output reduced to the second condition in FIG. 5. The frequency would therefore have shifted over 450 MHz. However, this would be only an average rate of shift of less than $4 \times 10^{-4}$ MHz per minute (well within specifications now published). Power feedback from a single mode is adequate for practical frequency stability as well as power stability performance.

Figure 6:
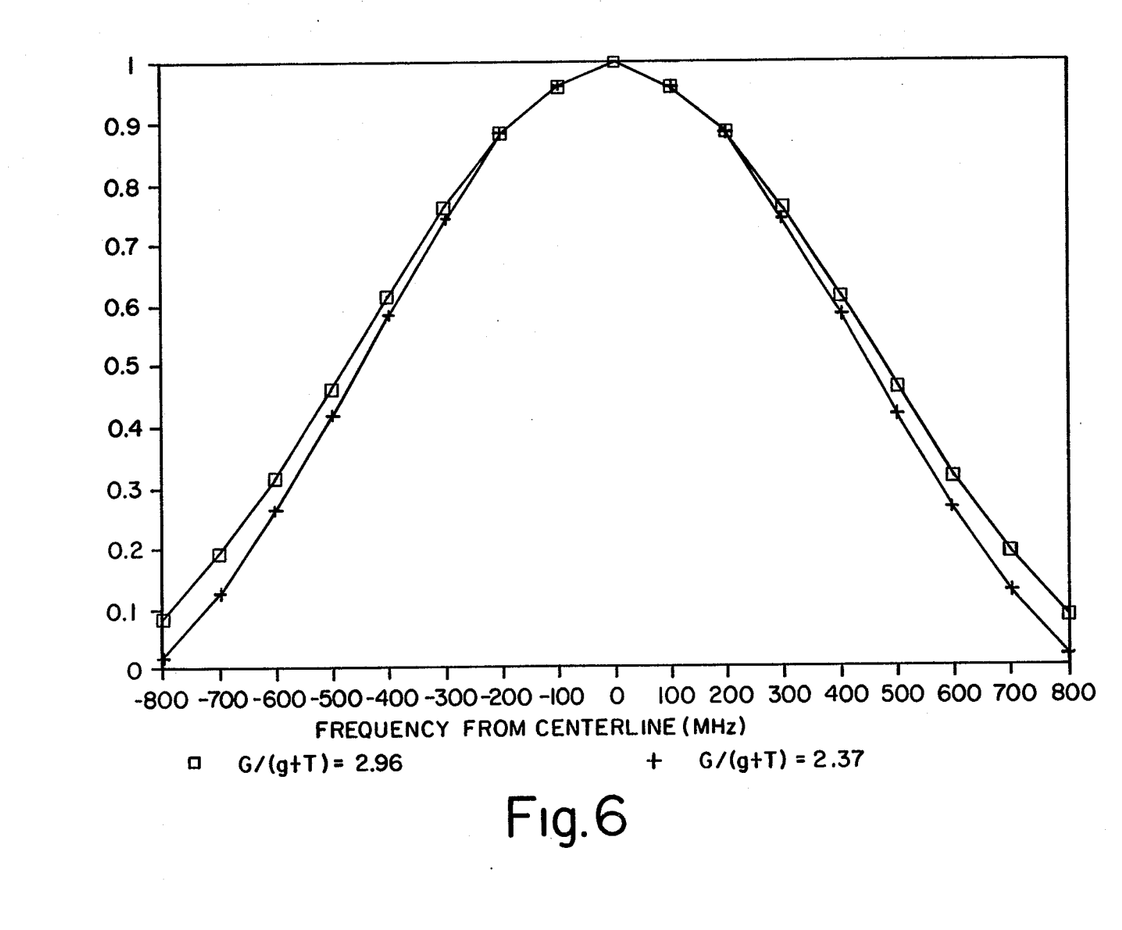
FIG. 6 is a graph of normalized Doppler power profiles.

If one were to normalize the theoretical curves of FIG. 5 to a centerline value of 1 as depicted in FIG. 6, each profile would overlap sufficiently well so as to enable the use of a calibration curve or look-up table to be used to accurately set a desired output frequency.

This might be accomplished using a control system to monitor the peak power during warm-up and thus set the appropriate fraction for the desired frequency selected. More simply, a power meter with a peak detection circuit could be used to monitor the peak power during warm-up and then the operator could manually adjust the output power fraction to a known calibration curve supplied with the laser. Note that scanning both sides of the Doppler output profile is possible by inverting the feedback signal from A2 (FIG. 4).

Absolute frequency stability can be accomplished by "feeding back" the power from both the "p" and "s" polarizations and using their differential null condition (equal mode powers) to establish a condition that is theoretically independent of the parameter variations (changes in the Doppler profile). This makes use of the fact that the profiles are symmetrical about the centerline frequency no matter the conditions of the parameters. Thus, a laser with a mode spacing of 1000 MHz could be operated so that each mode falls at $-500$ and 500 MHz relative to the centerline frequency under the Doppler profile. Note, however, that the maximum output power from the unlocked mode would be less than one-half the value it might be if it were aligned close to the centerline.

Having thus defined our invention with the detail and particularity required by the Patent Laws, what is claimed and desired to be protected by Letters Patent is set forth in the following claims.

We claim:

1. For a gas laser comprising a tube for containing a lasing medium, means to excite the lasing medium, and mirrors secured at each longitudinal end of said tube supported by hollow mirror mounts extending between the tube and the mirrors, a system for rapidly changing the length between the mirrors comprising
   (a) at least one of said mirror mounts being hollow and made of a nominally electrically conducting material and positioned so that the lasing axis passes therethrough
   (b) an induction coil surrounding the mirror mount made of a nominally electrically conductive material and outwardly spaced from said mirror mount,
   (c) means for applying an alternating current to the induction coil, and
   (d) means for modulating the current in the induction coil.

2. An adapter for being removably attached to a casing surrounding a gas laser, said laser comprising a tube for containing a lasing medium fixed within the casing, means to excite the lasing medium, and mirrors at each longitudinal end of the tube, at least one of said mirrors secured to the tube by a hollow mirror mount made of a nominally electrically conducting material, said hollow mirror mount extending between the mirror and the tube, said adapter comprising
   (a) a jacket for engaging and being secured to the casing surrounding the gas laser,
   (b) an induction coil fixed within said jacket and positioned to surround the hollow mirror mount at one end of the tube while being outwardly spaced from the hollow mount,
   (c) means for applying an alternating current to the induction coil, and
   (d) means for modulating the current in the induction coil.

3. An adapter for being removably attached to a casing surrounding a gas laser, said laser comprising a tube for containing a lasing medium fixed within the casing, means to excite the lasing medium, and mirrors at each longitudinal end of the tube, one mirror permitting passage of laser light therethrough thus defining the output end of the tube, the mirror at the output end of said tube secured to the tube by a hollow mirror mount made of a nominally electrically conducting material, said hollow mirror mount extending between the mirror and the tube, said adapter comprising
   (a) a jacket for engaging and being secured to the casing surrounding the gas laser at the output end thereof,
   (b) an induction coil fixed within said jacket and positioned to surround the hollow mirror mount while being outwardly spaced therefrom,
   (c) means for applying an alternating current to the induction coil,
   (d) means for modulating the current in the induction coil,
   (e) means for sampling the power of the output corresponding to at least one of the longitudinal cavity modes of said laser, and
   (f) feedback means for controlling the modulating means to maintain the output power of the laser substantially constant.

4. A constant power single frequency laser comprising (a) a tube for containing a lasing medium fixed within a casing, means to excite the lasing medium, and mirrors at each longitudinal end of the tube defining the length of the lasing cavity, the mirror at one end of said tube supported from the tube by a hollow mirror mount made of a nominally electrically conducting material, said hollow mirror mount extending between the mirror and the tube, the birefringerance of said mirrors and the length of said cavity selected so that the polarization of cavity modes is fixed relative to the tube and so that no more than three adjacent longitudinal cavity modes fall within the Doppler power profile above the loss threshold, (b) an induction coil surrounding the mirror mount and outwardly spaced therefrom, (c) means for applying an alternating current to the induction coil, (d) means for modulating the current in the induction coil thereby causing a change in the length of the mirror mount and the length of the lasing cavity, (e) means for sampling the power of the output corresponding to only one of the longitudinal cavity modes of said laser, (f) means for generating a reference signal to command a power output level for said sampled mode, and (g) feedback means for controlling the modulating means to maintain the output power of the laser substantially constant and thereby maintaining the output frequency of the laser substantially constant.

5. An adapter for converting a multiple frequency gas laser to a constant power single frequency laser, said laser comprising a casing in which is fixed a tube for containing a lasing medium, means to excite the lasing medium, and mirrors at each longitudinal end of the tube defining the length of the lasing cavity, one mirror permitting passage of laser light therethrough thus defining the output end of the tube, the mirror at the output end of said tube having a hollow mirror mount made of a nominally electrically conducting material, said hollow mirror mount extending between the mirror and the tube, the birefringence of said mirrors and the length of cavity selected so that the polarization of cavity modes is fixed relative to the tube and so that no more than three adjacent longitudinal cavity modes fall within the Doppler power profile above the loss threshold, said adapter comprising (a) a jacket for engaging and being secured to the casing surrounding the gas laser at the output end thereof, (b) an induction coil surrounding the mirror mount and outwardly spaced therefrom, (c) means for applying an alternating current to the induction coil, (d) means for modulating the current in the induction coil thereby causing a change in the length of the mirror mount and the length of the lasing cavity, (e) means for sampling the power of the output corresponding to only one of the longitudinal cavity modes of said laser, (f) means for generating a reference signal to command a power output level for said sampled mode, and (g) feedback means for controlling the modulating means to maintain the output power of the laser substantially constant and thereby maintaining the output frequency of the laser substantially constant.

* * * * *

UNITED STATES PATENT AND TRADEMARK OFFICE
CERTIFICATE OF CORRECTION

PATENT NO. : 4,819,246

DATED : April 4, 1989

INVENTOR(S) : Marc F. Aiello and John J. Grazulis

It is certified that error appears in the above-identified patent and that said Letters Patent is hereby corrected as shown below:

Column 2 Line 55 "bu" should read --but--.

Column 3 Line 40 "serv$_o$" should read --servo--.

Column 4 Line 18 "moninally" should read --nominally--.

Column 6 Line 44 "reference" should read --feedback--.

Column 6 Line 44 "feedback" should read --reference--.

Claim 1 a) Column 8 Line 13 after "therethrough" insert --,--.

Claim 4 a) Column 9 Line 9 "birefringerance" should read --birefringence--.

Signed and Sealed this

Twenty-first Day of November, 1989

*Attest:*

JEFFREY M. SAMUELS

*Attesting Officer*     *Acting Commissioner of Patents and Trademarks*